Dec. 16, 1924.
A. SAMUELSON
1,519,802
METHOD OF DAMMING FLOW OF MOLTEN GLASS
Filed Aug. 20, 1923
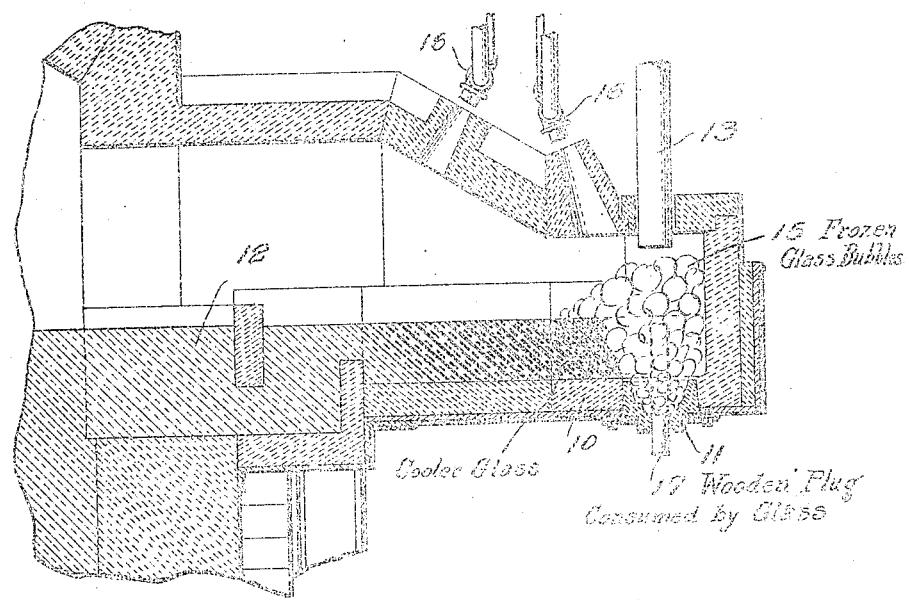
Inventor:
Alexander Samuelson
By Arthur M. Hood
Attorney.

Patented Dec. 16, 1924.

1,519,802

UNITED STATES PATENT OFFICE.

ALEXANDER SAMUELSON, OF TERRE HAUTE, INDIANA, ASSIGNOR TO WILLIAM P. ROOT, OF TERRE HAUTE, INDIANA.

METHOD OF DAMMING FLOW OF MOLTEN GLASS.

Application filed August 20, 1923. Serial No. 658,227.

*To all whom it may concern:*

Be it known that I, ALEXANDER SAMUELSON, a citizen of the United States, residing at Terre Haute, in the county of Vigo and State of Indiana, have invented a new and useful Method of Damming Flow of Molten Glass, of which the following is a specification.

In the automatic feeding of successive quantities of molten glass to successive molding devices, it has been the common practice for many years to deliver, to a cutting mechanism, a continuous or intermittent stream of molten glass, by gravity, through a downwardly directed orifice formed through the bottom of a snout, "dog house," or extension leading laterally from the melting tank or furnace, the glass being kept in proper condition for flow in and through said snout, generally, by means of flame directed by external burners into the interior of said snout.

Whenever a discontinuance of flow, for a substantial period, has been desired, it has been customary to plug the inner end of the out-flow orifice and, in some instances, to discontinue the supplemental heating flames. In either instance, however, it has been found that the glass in the outer end of the snout and adjacent the delivery orifice, chills to such an extent, that, after discontinuance of out-flow is maintained for any substantial period, great difficulty has been experienced in re-heating the glass in the snout so that the flow will be resumed, such re-heating requiring many hours.

Another method of causing discontinuance of out-flow has been to insert a refractory plug (such for instance as asbestos) in the outer end of the delivery orifice. In other instances, a cold metal rod has been projected upwardly and inwardly through the delivery orifice so as to form a temporary chilled pocket in the glass, said pocket being then stuffed with asbestos fiber retained in place by a plug driven into the outer end of the orifice. Resumption of flow in such instances has been accomplished in less time than in the earlier method mentioned above but, nevertheless, requiring considerable time and attention, because of the time required to re-heat the considerable mass of chilled glass adjacent the inner end of the delivery orifice, and the extraction of the asbestos packing.

My present invention is a method of damming out-flow of glass (or a similar substance) by the formation of a mass of congealed bubbles immediately adjacent the delivery orifice, and the maintenance of these bubbles in a congealed condition until flow is to be re-established.

The damming bubbles may be formed in several ways and for the purpose of clearly illustrating my invention, the accompanying drawing is a vertical section of a suitable delivery spout and adjacent portion of the tank or furnace, the glass mass and the damming bubbles being indicated diagrammatically.

In the drawings, 10 indicates the delivery spout, having a downwardly directed delivery orifice 11 through which the mass of molten glass 12 may flow.

In many instances a refractory plunger 13 is projected downwardly into the glass immediately above the upper inner end of the orifice and manipulated to control, to a greater or lesser extent, the out-flow through the orifice. When such a plunger is used, it is desirable, as a preliminary to the practice of my damming process, to retract this plunger from the mass of molten glass, as indicated in the drawing.

When a damming of out-flow through the orifice is desired, the depending stream of glass from the orifice is preferably cut close to the orifice and a mass of congealed bubbles 15 is formed immediately adjacent the inner end of the delivery orifice, said mass of congealed bubbles being preferably formed by means inserted upwardly through the delivery orifice.

One way in which the mass of damming bubbles may be formed, is as follows: The supplemental heating flames from the burners 16 are discontinued and, after the flowing stream is cut close to the orifice, an air pipe may be projected upwardly through the orifice into the mass of glass and air injected into the mass of glass so as to produce the desired congealed bubbles. In this connection it should be understood by "bubbles" I do not necessarily mean an imperforate bubble or mass of imperforate bubbles, but instead, a congealed cellular or bubble-like mass made up of a mass of comparatively thin contacting walls forming a body of small mass occupying a relatively large volume.

Another, and preferred, way in which the body of damming bubbles may be formed, is by driving a plug of wood 17, or other gas producing material, upwardly through the orifice into the mass of glass, said combustible plug being previously moistened if desired, and preferably of such diameter that its lower end will remain in place in the orifice after the upper inner end has been consumed. When the combustible plug enters the molten glass, it is promptly consumed and during the process of consumption a sufficient quantity of gas is thereby produced to throw the molten glass adjacent the inner end of the orifice into a mass of congealed bubbles, or froth, which press back the oncoming molten glass into or toward, the furnace, and dam further flow.

When re-flow is desired, the supplemental heating flames from burners 16 are directed into the snout 10 and, because the mass of glass in the damming bubbles or froth is comparatively small, due to the thin walls of the bubbles, said frothy or bubbly mass will be quickly reduced to a highly molten condition so that, the orifice being previously opened, re-flow will be promptly established within a period much shorter than has heretofore been found possible.

I claim as my invention:

1. The method of damming flow of molten glass or similar material which consists in forming a dam of congealed bubbles of such material.

2. The method of damming flow of molten glass or similar material which consists in forming a dam of congealed bubbles of such material by inserting a quantity of combustible material into the molten mass at the point to be dammed.

3. The method of damming flow of molten glass or similar material which consists in forming a dam of congealed bubbles of such material by inserting into the molten mass, at the point to be dammed, a quantity of material capable of yielding a quantity of gas under the action of the molten glass.

4. The method of damming out-flow of molten glass, or similar material, through a downwardly directed orifice, which consists in inserting upwardly through said orifice, into the molten material adjacent the orifice, an article capable of coaction with the molten glass to produce a gas acting to develop, adjacent the inner end of the orifice, a congealed mass of bubbles.

5. The method of damming out-flow of molten glass or a similar material through a downwardly directed passage, which consists in the formation, between the outlet of said passage and the supply of molten glass, of a mass of congealed bubbles of said material.

6. The method of damming out-flow of molten glass or a similar material through a downwardly directed passage, which consists in the formation, between the outlet of said passage and the supply of molten glass, of a mass of congealed bubbles of said material by immersing in the glass, at the desired point, a material capable of co-action with the molten glass to form a quantity of bubble-forming gas.

7. The method of damming out-flow of molten glass or similar material, through a downwardly directed passage, which consists of formation between the outlet of said passage and the supply of molten glass, of a mass of congealed bubbles of said material by immersing in the glass at the desired point, a piece of combustible material, such as wood.

8. The method of damming flow of molten glass, or similar material, which consists in the formation of a dam composed of a mass of congealed bubbles of said material by immersing in the glass a sufficient quantity of combustible material, such as wood.

9. The method of damming out-flow of molten glass, or similar material through a downwardly directed passage which consists in projecting a plug of combustible material, such as wood, upwardly through the outlet and into the molten glass, thereby forming, between the supply of glass and the outlet of the passage, a mass of congealed bubbles of glass.

In witness whereof, I, ALEXANDER SAMUELSON, have hereunto set my hand at Terre Haute, Indiana, this 14th day of August, A. D. one thousand nine hundred and twenty-three.

ALEXANDER SAMUELSON.